April 11, 1950  E. H. WILLETTS  2,503,368
CLAMPING MEANS
Filed June 15, 1946  2 Sheets-Sheet 1
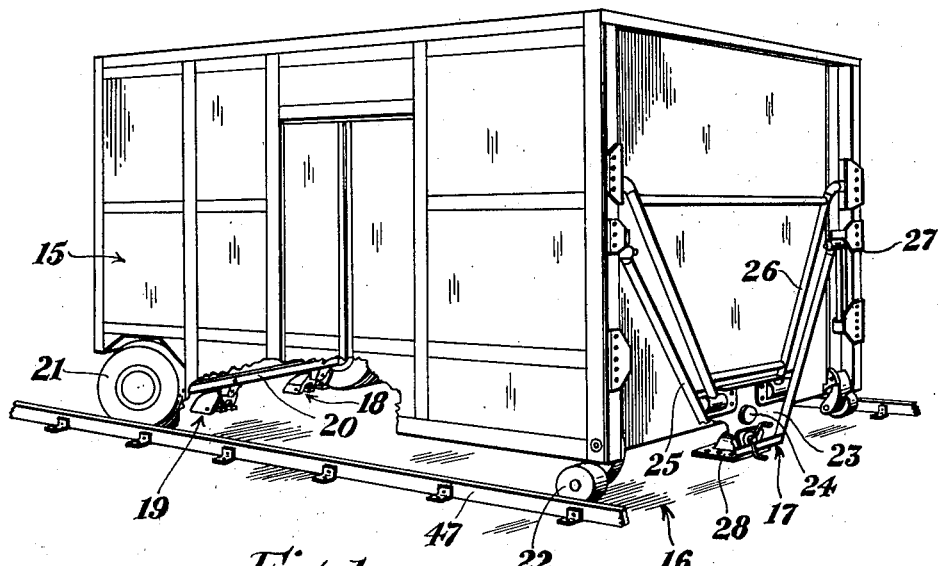
Fig.1
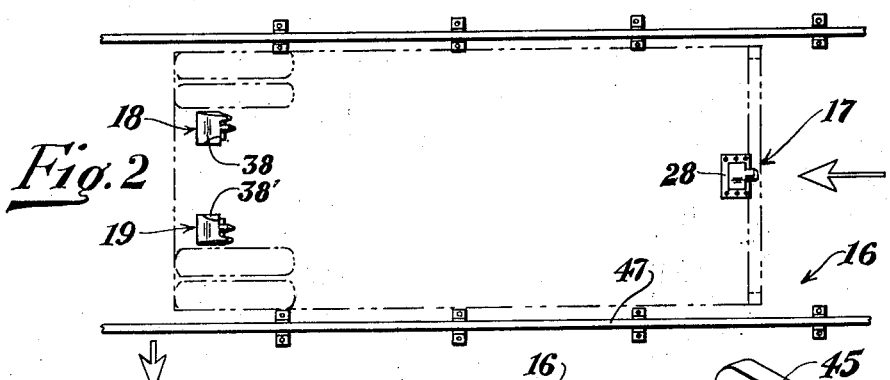
Fig.2
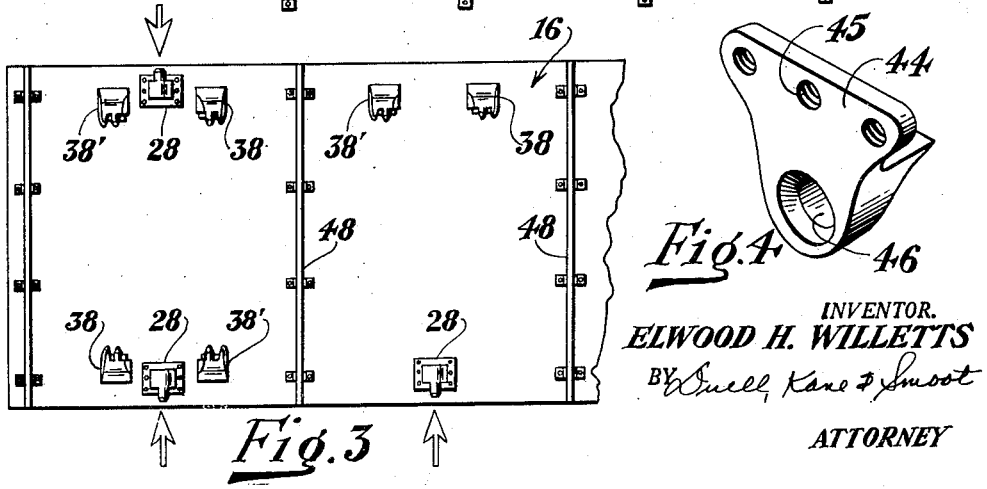
Fig.3
Fig.4
INVENTOR.
ELWOOD H. WILLETTS
BY Duell, Kane & Smoot
ATTORNEY April 11, 1950     E. H. WILLETTS     2,503,368
CLAMPING MEANS
Filed June 15, 1946     2 Sheets-Sheet 2
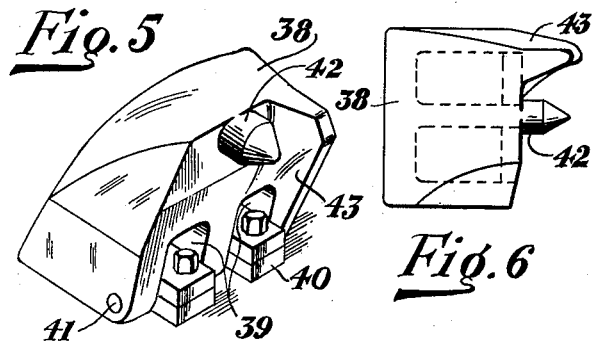
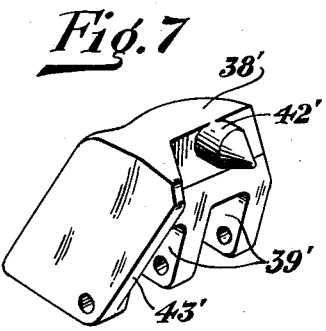
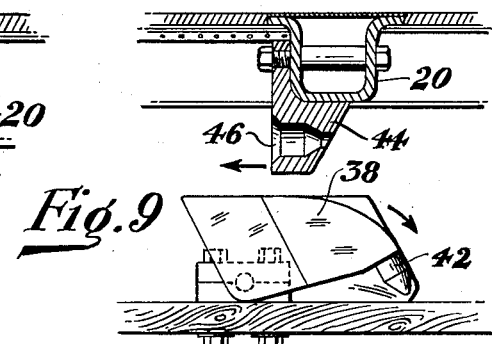
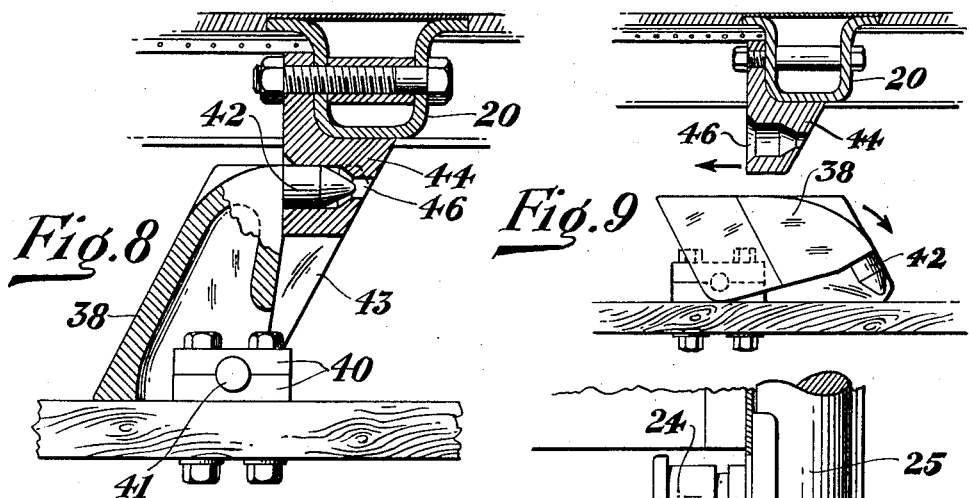
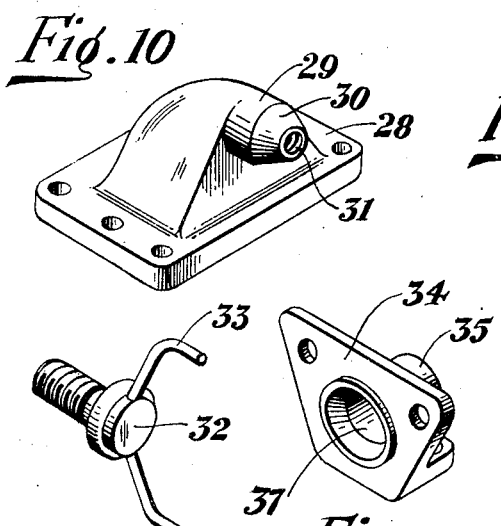
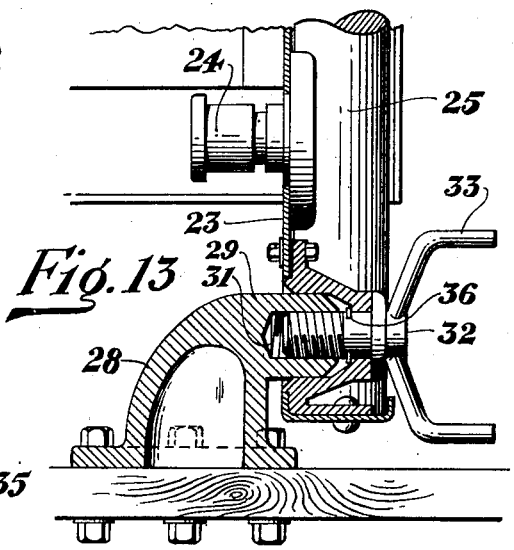
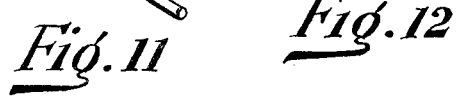
INVENTOR.
ELWOOD H. WILLETTS
BY Duell, Kane & Smoot
ATTORNEY Patented Apr. 11, 1950

2,503,368

UNITED STATES PATENT OFFICE 2,503,368

CLAMPING MEANS

Elwood H. Willetts, Douglaston, N. Y.

Application June 15, 1946, Serial No. 677,071

7 Claims. (Cl. 248—361)

This invention relates to improved clamping means for use in securing a vehicle such as a trailer to a deck or floor such as the deck of a railroad car, ship or aircraft.

Trailers of the type used in highway freight transport are sometimes carried on the deck of railroad cars in what is termed trailer flat car service. It will be appreciated that it is necessary for the trailers to be firmly secured to the deck of the car so as to avoid transverse movement of the vehicle which would interfere with railroad line clearances, and so as to secure the vehicle against longitudinal movements resulting from buffing shocks.

The attachment or securing of the trailers to the decks has presented serious difficulties and heretofore no satisfactory securing device has been devised. Thus, the conventional method heretofore employed has been to chock the tires of the vehicle and then attach chains and turnbuckles from the deck to the frame of the vehicle. Due to the angle of the chain extending from deck to vehicle the stress from the buffing shocks has tended to create a resultant downward force of sufficient moment to cause distortion or permanent strain in the vehicle frame. Also, at times it has been the practice to interpose an adjustable jack between the deck and the vehicle frame for the purpose of eliminating any possible misalignment resulting from tire deflation and also for the purpose of tightening or adjusting the chains where no turnbuckles are employed. The jacks are also desirable in many instances due to the inadequacy of the supporting mechanism at the forward end of the usual semi-trailer. The difficulties attending the use of such jacks will be immediately appreciated.

It is a primary object of the present invention to overcome the difficulties heretofore encountered and to provide improved vehicle clamping means which will firmly secure trailers or other vehicles in position on a moving deck such as the deck of a railroad car so as to avoid movement and so as to withstand buffing shocks without damaging or distorting the frame of the vehicle.

A further object is the provision of an improved vehicle clamping device of the above character which is of simple and rugged construction so that it can be used over a long period of time with comparative freedom from breakage or wear, which is easy to install, assemble and disassemble and which can be mounted on a deck in such a manner as to give flexibility to the arrangement of the vehicles on the deck.

Other objects will be apparent from the following description of the drawings in which—

Fig. 1 is a perspective view of a trailer secured to a deck by my improved clamping means;

Fig. 2 is a plan view of a deck showing clamping brackets mounted thereon for longitudinal arrangement of a vehicle;

Fig. 3 is a plan view of a portion of a deck showing clamping brackets mounted thereon for transverse arrangement of the vehicles;

Fig. 4 is a perspective view of one of the clamping plates forming part of my device;

Fig. 5 is a perspective view of a clamping bracket hingedly or pivotally mounted on the deck so as to be engageable with a clamping plate mounted adjacent one end of the vehicle at one side thereof;

Fig. 6 is a plan view of the clamping bracket shown in Fig. 5;

Fig. 7 is a perspective view of a slightly modified clamping bracket for engagement with a clamping plate on the opposite side of the vehicle;

Fig. 8 is a detailed sectional view showing inter-engagement between one of the clamping brackets and clamping plates;

Fig. 9 illustrates the manner in which the hinged clamping bracket may be tilted forwardly to provide clearance for the vehicle as it is moving into position on the deck.

Fig. 10 is a perspective view of the fixed clamping bracket which is engageable with a clamping member mounted adjacent the opposite end of the figure at the center thereof;

Fig. 11 is a perspective view of the clamping member which is engageable with the fixed clamping bracket;

Fig. 12 is a perspective view of the supporting plate and bushing for the clamping member; and Fig. 13 is a detailed view partially in section of the fixed clamping plate and clamping member in inter-engaged position.

My invention is applicable to vehicles of various types and may be used for securing them in a satisfactory manner to the decks or flooring of trains, boats or aircraft. I accomplish the desired results by providing releasable, rigid connection between the vehicle body and the deck in the manner herein described.

In the accompanying drawings I have illustrated my invention as being applied to a semi-trailer 15 which is secured to the deck 16 of a railroad flat car by means of a clamping device 17 at the central part of the front of the trailer and clamping devices 18 and 19 located adjacent the two sides of the trailer at the rear thereof.

The specific construction of the vehicle forms no part of my present invention. However, the semi-trailer illustrated is of the general type shown in my Patent #2,038,975 granted on April 28, 1936, and consists of a body having a suitable frame supported near the rear thereof by means of a fixed transverse axle 20 having wheels 21 mounted at opposite ends thereof. At its forward end the trailer may be provided with suitable retractable wheels 22 and also with a coupling member 23 provided with a king-pin 24 which is engageable with a fifth wheel mounted on the tractor or truck.

The coupling member 23 is shiftable from horizontal operable position at which point it is engageable with the fifth wheel to vertical inoperable position as shown in Figs. 1 and 13. For this purpose the coupling member 23 is mounted on the trailer by means of two pairs of diverging arms or brackets 25 and 26, the arms 25 being fixedly attached to the coupling member at one end and being provided with a sliding pivotal mounting 27 connecting them to the front of the trailer at the opposite end. The arms 26 are pivotally attached at opposite ends to the coupling member and to the front of the trailer respectively. Transverse braces may be provided between the arms 26 as shown. An arrangement of this general type is shown in my above referred to patent and permits the coupling member to shift between horizontal operable position and vertical depending inoperable position.

The clamping devices 17, 18 and 19 are arranged so as to provide a rigid connection between the vehicle, particularly the body thereof, and the deck. I have found that more satisfactory results are obtained by providing the clamping connections adjacent the opposite ends of the vehicle body in the manner shown. More efficient utilization of the deck space and greater facility in driving the vehicles on and off of the deck without interference from the clamping devices is attained by disposing the clamping devices in a generally triangular arrangement with the clamping devices 18 and 19 engageable with opposite sides of the vehicle adjacent one end and clamping device 17 engageable with the central portion of the vehicle at the opposite end thereof.

Each of the clamping devices consists of a fastening device or bracket mounted on the deck and of a cooperable fastening member mounted on the vehicle. Thus, the clamping device 17 consists of a clamping bracket 28 fixedly mounted on the deck by means of screws or bolts. The bracket 28 has an upstanding central body portion having a stud 29 projecting from the forward face thereof, the stud being provided with a tapered end portion 30 with an internally threaded central opening 31.

The clamping bracket 28 is inter-engageable with a cooperating fastening member mounted on the vehicle. In the case of the semi-trailer 15 illustrated in the accompanying drawing this fastening member is mounted on the coupling member 23 at the center of the front of the vehicle and takes the form of a clamping screw or stud 32 having a threaded shank which is engageable with the threaded opening 31 in the bracket and has an enlarged head which may be provided with an operating handle such as illustrated at 33. The clamping screw is supported in a mounting plate 34 which in turn is suitably mounted in the coupling member 23. The mounting plate is provided with a tubular bushing 35 through which the clamping screw projects and the clamping screw is suitably held in position so that it may rotate by the engagement of the head with one end of the bushing and by means of a snap-ring 36 disposed in a groove in the shank of the screw. The bushing terminates in an enlarged socket 37 which preferably flares outwardly at the end thereof and the socket is of such a size as to receive the stud 29 on the bracket. The tapered end on the stud and the flared end on the socket 37 facilitate inter-engagement between the parts.

In assembling the clamping bracket 28 on the deck with the clamping member on the vehicle, the stud 29 is projected into the socket 37 and clamping screw 32 is rotated by means of the handle 33 in a clockwise direction so as to engage the threads. This forms a positive rigid connection between the vehicle frame and the deck at the one end of the vehicle which can be readily assembled and disassembled when desired but which is firmly held against accidental release. Since the fastening member 32 is mounted on the coupling member 23 it will be appreciated that the forces and strains are distributed to both sides of the front of the vehicle by brackets 25 and 26 which serve as stress members.

The clamping devices 18 and 19 at the opposite end of the vehicle take the form of brackets 38 and 38' respectively which are similar in construction but are opposite in the arrangement of their parts so that one bracket is a mirror-image of the other. Brackets 38 and 38' are pivotally or hingedly mounted so that they may shift from elevated operative position as shown in Figs. 5 to 8 to tilted or inoperative position as shown in Fig. 9. By depressing or tilting the brackets 38 and 38' in the manner shown in Fig. 9 clearance is provided between the respective parts of the fastening devices so that a vehicle may be shifted past the portion of the deck on which the brackets are mounted.

Each of the brackets 38 and 38' consists of a body portion with slotted openings 39 and 39' in the forward wall extending upwardly from the lower edge and adapted to accommodate the superimposed mounting plates 40 secured to the deck of the car by suitable bolts. The mounting plates 40 support the pivots 41 which extend through the body portion of the brackets and serve, in turn, to support the brackets so that they may pivot between upright and tilted positions.

The forward face of each bracket 38 and 38' is provided, at its upper end, with a stud 42 and 42' respectively which projects outwardly and tapers at the end thereof. The right side of bracket 38 as viewed in Figs. 5 and 6 and the left side of bracket 38' as viewed in Fig. 7 form deflecting walls and are disposed at an angle in both the vertical and horizontal planes. Thus, each wall extends inwardly from its lower to its upper end and from its rear edge to its forward edge. The same side of each bracket is also provided with a forwardly projecting extension 43 and 43' respectively. The deflecting walls serve to engage the tire or wheel of the vehicle and deflect it laterally so as to bring the clamping members into proper alignment. In this connection the clamping brackets 38 and 38' are preferably mounted on the deck so that when the vehicle is in clamped position the two brackets will be disposed at the rear of the vehicle adjacent the two sides thereof in close proximity to the inner surface of the wheels and tires as shown most clearly in Fig. 2.

The brackets 38 and 38' are adapted to interengage with clamping members attached to the vehicle particularly to the frame thereof. The clamping member in this instance may take the form of a clamping plate 44 having a series of apertures 45 near the upper end thereof whereby it may be attached to the vehicle and a socket 46 flaring outwardly at the end thereof and adapted to receive the studs 42 or 42' of the respective brackets 38 or 38'. The clamping plates 44 are preferably secured directly or indirectly to the frame of the vehicle. In the present instance the rear axle 20 is secured directly to the vehicle body and frame without the inter-position of springs and accordingly the plates can conveniently be attached to the axle in the manner most clearly shown in Fig. 8. In this connection the body of the plate may be shaped to conform with the axle so as to give additional support and re-enforcement to the plate. A pair of plates 44 are secured to the rear axle adjacent the two ends thereof so as to be engageable with the clamping brackets 38 and 38'.

My clamping device may be mounted on the deck of a railroad car, boat or the like so that the trailers or other vehicles may be arranged longitudinally on the deck as shown in Figs. 1 and 2 or transversely as shown in Fig. 3. When arranged as shown in Figs. 1 and 2 I preferably provide longitudinal guide rails 47 which serve to guide and confine the vehicles within the clamping area. The clamping brackets 28, 38 and 38' are then attached to the deck in a longitudinally extending triangle so that when the trailer is moved to the clamping area the brackets 38 and 38' will interengage with the clamping plates 44 on the rear axle of the vehicle and clamping bracket 28 will be engaged by the clamping screw 32 mounted on the coupling member at the front of the vehicle. The clamping brackets are so disposed that when clamping screw 32 is engaged with bracket 28 and secured tightly into position, sockets 46 on clamping plates 44 are forced into engagement with studs 42 on brackets 38 and are held in assembled relationship.

When the trailers or other vehicles are to be mounted transversely of the deck the clamping brackets are mounted on the deck in similar triangular arrangement disposed transversely thereof with guide rails 48 disposed between adjacent clamping areas. So that the trailer may be backed onto the deck from either side thereof, two sets of brackets may be mounted in opposite relationship in each clamping area as shown in the left hand side of Fig. 3.

When the vehicle is secured in position by my improved clamping arrangement it is rigidly clamped in place between clamps engaging the opposite end of the vehicle. It will be seen that movement of the deck or buffing shocks will not result in downward forces or reactions which will strain or distort the vehicle frame. It will also be seen that the clamp is relatively simple in construction, positive in action, easy to install and assemble and will give satisfactory service over a long period of time.

While I have shown my invention as applied to a semi-trailer of one particular type it will be appreciated that it is equally applicable to other types of vehicles and also removable freight containers and bodies.

While I have shown the clamping plates 44 as being mounted on axle 20 in the illustrated embodiment wherein springs have been omitted between the axles and body, it should be understood that the plates 44 may be attached to the body in any other satisfactory manner. It should also be appreciated that my invention is not only suitable for securing vehicles to the decks of freight cars but also to any other deck or flooring such as the deck of a ship or aircraft.

It should be understood that modifications may be made in the illustrated embodiment of my invention without departing from the invention as set forth in the accompanying claims.

I claim:

1. Apparatus for securing a vehicle to a deck comprising first and second clamping members secured adjacent opposite sides of the vehicle at one end thereof, a third clamping member secured adjacent the center of the vehicle at the opposite end thereof, stress members connected between the third clamping member and the two sides of the vehicle for distributing the stresses, and first, second and third clamping devices secured to the deck in generally triangular arrangement and being inter-engageable with the first, second and third clamping members respectively on the vehicle to clamp the vehicle therebetween.

2. Apparatus for securing a vehicle to a deck comprising first and second rigid clamping members secured adjacent opposite sides of the vehicle at one end thereof, a third rigid clamping member secured adjacent the center of the vehicle at the opposite end thereof and first, second and third rigid clamping devices secured to the deck in generally triangular arrangement and being inter-engageable with the first, second and third rigid clamping members respectively on the vehicle to clamp the vehicle therebetween, said first and second clamping devices and the third clamping member being shiftable to inoperative clamping positions so as to provide clearance for the passage of the vehicle over the deck.

3. A clamping device to be used in clamping a vehicle to a deck comprising a clamping member secured to the vehicle in predetermined relationship to one of the wheels thereof, and a clamping device mounted on the deck and being inter-engageable with the clamping member to clamp the vehicle to the deck, the clamping device being positioned adjacent the aforesaid wheel when the vehicle is in clamped position and the clamping device being formed with a deflecting wall disposed at an inwardly extending angle from its lower edge to the upper edge and from its rear edge to its forward edge, said deflecting wall being cooperable to deflect the said wheel of the vehicle when it engages it so as to bring the clamping member into alignment with the clamping device.

4. Apparatus for rigidly securing a vehicle to a deck comprising a pair of cooperating clamping members cooperable to be mounted on the deck and on the vehicle respectively, said members having portions which are releasably interengageable with each other to rigidly secure the vehicle to the deck and said portions having camming surfaces adjacent their areas of initial engagement to center and align the portions with respect to each other and said portions also having non-camming surfaces which engage each other when the portions are fully interengaged so as to maintain said portions in relatively fixed position.

5. Apparatus for rigidly securing a vehicle to a deck comprising a pair of cooperating clamping members cooperable to be mounted on the deck and on the vehicle respectively, one of said members having a horizontally disposed socket which flares outwardly at its outer end and the other member having a horizontally disposed stud which tapers inwardly at its outer end and which is interengageable with the socket to rigidly secure the vehicle to the deck the flared portion of the socket and the tapered portion of the stud being engageable with each other to center and align the members with respect to each other while the members are being interengaged said stud and socket also having untapered and unflared portions which have tight engagement with each other when the members are fully interengaged so as to retain the members in relatively fixed position.

6. Apparatus for rigidly securing a cushion-mounted vehicle to a deck comprising rigid clamping devices mounted on the deck in spaced relationship and rigid clamping members having engagement with the body of the vehicle, said clamping devices and members having inter-engaging parts so that each clamping member may interengage with a clamping device, said interengaging parts being formed to prevent relative movement of the parts in any vertical or vertically inclined direction when interengaged, and said clamping devices and members being arranged to prevent movement in any horizontal direction when all of said devices and members are fully inter-engaged whereby the vehicle is rigidly clamped to the deck and held against movement in any direction with respect thereto.

7. In apparatus for rigidly clamping a vehicle to a clamping device on a deck, the combination of a trailing vehicle having a kingpin frame whereby the vehicle may be drawn, said kingpin frame being hingedly connected to the forward end of the vehicle so that it may be shifted between operative and inoperative positions and a clamping member mounted on the kingpin frame at a point remote from the hinged connection so as to be engageable with a clamping device on a deck when the kingpin frame is in inoperative position.

ELWOOD H. WILLETTS.

REFERENCES CITED

The following references are of record in the file of this patent:

UNITED STATES PATENTS

| Number | Name | Date |
|---|---|---|
| 1,733,269 | Mauk et al. | Oct. 29, 1929 |
| 1,804,542 | Perin | May 12, 1931 |
| 1,862,632 | Perin | May 12, 1931 |
| 2,351,314 | Ario | June 13, 1944 |